United States Patent
Lin et al.

(10) Patent No.: US 9,726,549 B2
(45) Date of Patent: Aug. 8, 2017

(54) ELECTRONIC THERMOMETER

(71) Applicant: RADIANT INNOVATION INC., Hsinchu (TW)

(72) Inventors: Tseng Lung Lin, Hsinchu County (TW); Shao-Yun Yu, Hsinchu (TW)

(73) Assignee: Radiant Innovation Inc., Hsinchu (TW)

( * ) Notice: Subject to any disclaimer, the term of this patent is extended or adjusted under 35 U.S.C. 154(b) by 542 days.

(21) Appl. No.: 14/514,599

(22) Filed: Oct. 15, 2014

(65) Prior Publication Data

US 2016/0109300 A1     Apr. 21, 2016

(51) Int. Cl.
*G01K 1/08* (2006.01)
*G01K 7/00* (2006.01)

(52) U.S. Cl.
CPC ...................... *G01K 1/08* (2013.01)

(58) Field of Classification Search
USPC .................................................. 374/208, 163
See application file for complete search history.

(56) References Cited

U.S. PATENT DOCUMENTS

| | | | | |
|---|---|---|---|---|
| 5,018,875 A * | 5/1991 | Cook | ............ | G01K 1/028 374/163 |
| 5,044,770 A * | 9/1991 | Haghkar | ............ | G01K 1/08 242/400 |
| 6,406,182 B1 * | 6/2002 | Chen | ............ | G01K 1/14 374/208 |
| 6,854,880 B2 * | 2/2005 | Hsieh | ............ | G01K 13/002 374/158 |
| 6,957,911 B2 * | 10/2005 | Wong | ............ | G01K 13/002 374/163 |
| 7,520,668 B2 * | 4/2009 | Chen | ............ | G01J 5/02 374/121 |
| 2005/0047478 A1 * | 3/2005 | Yu | ............ | G01K 13/002 374/163 |
| 2006/0233219 A1 * | 10/2006 | Harris | ............ | G01J 5/0037 374/155 |
| 2011/0075701 A1 * | 3/2011 | Son | ............ | G01K 1/08 374/100 |

* cited by examiner

*Primary Examiner* — Mirellys Jagan
(74) *Attorney, Agent, or Firm* — Rosenberg, Klein & Lee

(57) ABSTRACT

An electronic thermometer includes an external casing unit, a circuit substrate, an electronic switch, a rotating arm unit, a probe unit and a waterproof unit. The external casing unit includes a top cover casing and a bottom cover casing, a receiving space is formed between the top and the bottom cover casings, and the bottom cover casing has a through hole communicated with the receiving space. The waterproof unit includes a first waterproof element and a second waterproof element. The first waterproof element is disposed between the top cover casing and the bottom cover casing and around the receiving space for preventing water vapor from entering the receiving space through the external casing unit, and the second waterproof element is disposed inside the through hole of the bottom cover casing for preventing water vapor from entering the receiving space through the through hole.

14 Claims, 11 Drawing Sheets

ELECTRONIC THERMOMETER

BACKGROUND OF THE INVENTION

1. Field of the Invention

The instant disclosure relates to an electronic thermometer, and more particularly to an electronic thermometer for preventing water vapor from entering a receiving space through an external casing unit.

2. Description of Related Art

Electronic thermometers generally offer a great number of advantages over conventional glass and mercury thermometers for use in the health care field. Among the advantages of electronic thermometers are the elimination of sterilization procedures for glass thermometers, made possible by the use of disposable covers; elimination of the possibility of broken glass if a thermometer is dropped; a digital temperature display to eliminate temperature reading errors; and with proper circuit design and calibration, higher accuracy and resolution is possible with accurate measurement and display of tenths of a degree Fahrenheit being easily attainable.

SUMMARY OF THE INVENTION

One aspect of the instant disclosure relates to an electronic thermometer for preventing water vapor from entering a receiving space through an external casing unit.

One of the embodiments of the instant disclosure provides an electronic thermometer, comprising: an external casing unit, a circuit substrate, an electronic switch, a rotating arm unit, a probe unit and a waterproof unit. The external casing unit includes a pivot shaft, a receiving space and an extending portion, wherein the pivot shaft is disposed on the extending portion and outside the receiving space, the external casing unit includes a top cover casing and a bottom cover casing, the receiving space is formed between the top cover casing and the bottom cover casing, and the bottom cover casing has a through hole communicated with the receiving space. The circuit substrate is disposed inside the receiving space. The electronic switch is electrically connected to the circuit substrate, wherein the electronic switch includes a trigger portion disposed inside the through hole and corresponding to the pivot shaft. The rotating arm unit includes a rotation base, a concave groove and a pivot portion, wherein the rotation base is pivotally disposed on the pivot shaft through the pivot portion, and the rotation base is reciprocatedly moved between a first position and a second position relative to the pivot shaft. The probe unit is disposed on the rotating arm unit and electrically connected to the circuit substrate. The waterproof unit includes a first waterproof element and a second waterproof element for covering the trigger portion of the electronic switch. When the rotation base is moved from the second position to the first position, the rotation base is separated from the trigger portion of the electronic switch. When the rotation base is moved from the first position to the second position, the rotation base is abutted against the trigger portion of the electronic switch to turn on the electronic switch. In addition, the first waterproof element is disposed between the top cover casing and the bottom cover casing and around the receiving space for preventing water vapor from entering the receiving space through the external casing unit, and the second waterproof element is disposed inside the through hole of the bottom cover casing for preventing water vapor from entering the receiving space through the through hole.

More precisely, the rotation base has an abutting surface abutted against the trigger portion of the electronic switch for turning on the electronic switch. The electronic thermometer further comprising: a display module disposed on the external casing unit and electrically connected to the circuit substrate. The second waterproof element has a plane portion, a convex portion opposite to the plane portion, and a concave portion formed on the plane portion. The plane portion and the concave portion of the second waterproof element are made of elastic material, and the convex portion is reciprocatedly moved by matching the plane portion and the concave portion. The abutting surface of the rotation base is abutted against the trigger portion of the electronic switch through the convex portion of the second waterproof element. The probe unit includes a probe and a temperature sensing element, and the temperature sensing element is disposed inside the probe and electrically connected to the circuit substrate. The external casing unit has a passing hole, the rotation base has a slot, the temperature sensing element is electrically connected to the circuit substrate through the slot and the passing hole in sequence, and the passing hole is filled with gel for preventing water vapor from entering the receiving space through the passing hole.

Another one of the embodiments of the instant disclosure provides an electronic thermometer, comprising: an external casing unit, a circuit substrate, an induction switch, a rotating arm unit, a sensing element, a probe unit and a waterproof unit. The external casing unit includes a pivot shaft, a receiving space and an extending portion, wherein the pivot shaft is disposed on the extending portion and outside the receiving space, the external casing unit includes a top cover casing and a bottom cover casing, and the receiving space is formed between the top cover casing and the bottom cover casing. The circuit substrate is disposed inside the receiving space. The induction switch electrically connected to the circuit substrate. The rotating arm unit includes a rotation base, a receiving groove and a pivot portion, wherein the rotation base is pivotally disposed on the pivot shaft through the pivot portion, and the rotation base is reciprocatedly moved between a first position and a second position relative to the pivot shaft. The sensing element is disposed inside the receiving groove. The probe unit is disposed on the rotating arm unit and electrically connected to the circuit substrate. The waterproof unit includes a first waterproof element disposed between the top cover casing and the bottom cover casing and around the receiving space for preventing water vapor from entering the receiving space through the external casing unit.

More precisely, the induction switch is one of a Hall effect sensor switch and a magnetic reed switch. When the rotation base is moved from the second position to the first position, the sensing element is adjacent to the induction switch and corresponds to the induction switch, wherein when the rotation base is moved from the first position to the second position, the sensing element is separated from the induction switch to turn on the induction switch. The sensing element is embedded in the rotation base and enclosed by the rotation base. The probe unit includes a probe and a temperature sensing element, and the temperature sensing element is disposed inside the probe and electrically connected to the circuit substrate. The external casing unit has a passing hole, the rotation base has a slot, the temperature sensing element is electrically connected to the circuit substrate through the slot and the passing hole in sequence, and the passing hole is filled with gel for preventing water vapor from entering the receiving space through the passing hole.

Therefore, in one embodiment, when the probe unit is rotated to move the abutting surface of the rotation base to abut against the elastic convex portion of the second waterproof element, the plane portion of the second waterproof element is pressed to abut against the trigger portion of the electronic switch by the rotation base in order to turn on the electronic switch of the electronic thermometer. In another embodiment, when the probe unit is rotated to move the sensing element disposed on the rotation base to separate from the induction switch, the magnetic induction generated by the sensing element cannot affect the induction switch, thus the induction switch can be turned on by separating the sensing element from the induction switch. More precisely, the waterproof ring can be used to prevent water vapor from entering the receiving space through the joint between the bottom cover casing and the battery cover, and the another rubber plug can be used to prevent water vapor from entering the receiving space through the securing hole of the battery cover.

To further understand the techniques, means and effects of the instant disclosure applied for achieving the prescribed objectives, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

The embodiments of "an electronic thermometer" of the instant disclosure are described. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

First Embodiment

Figure 1:
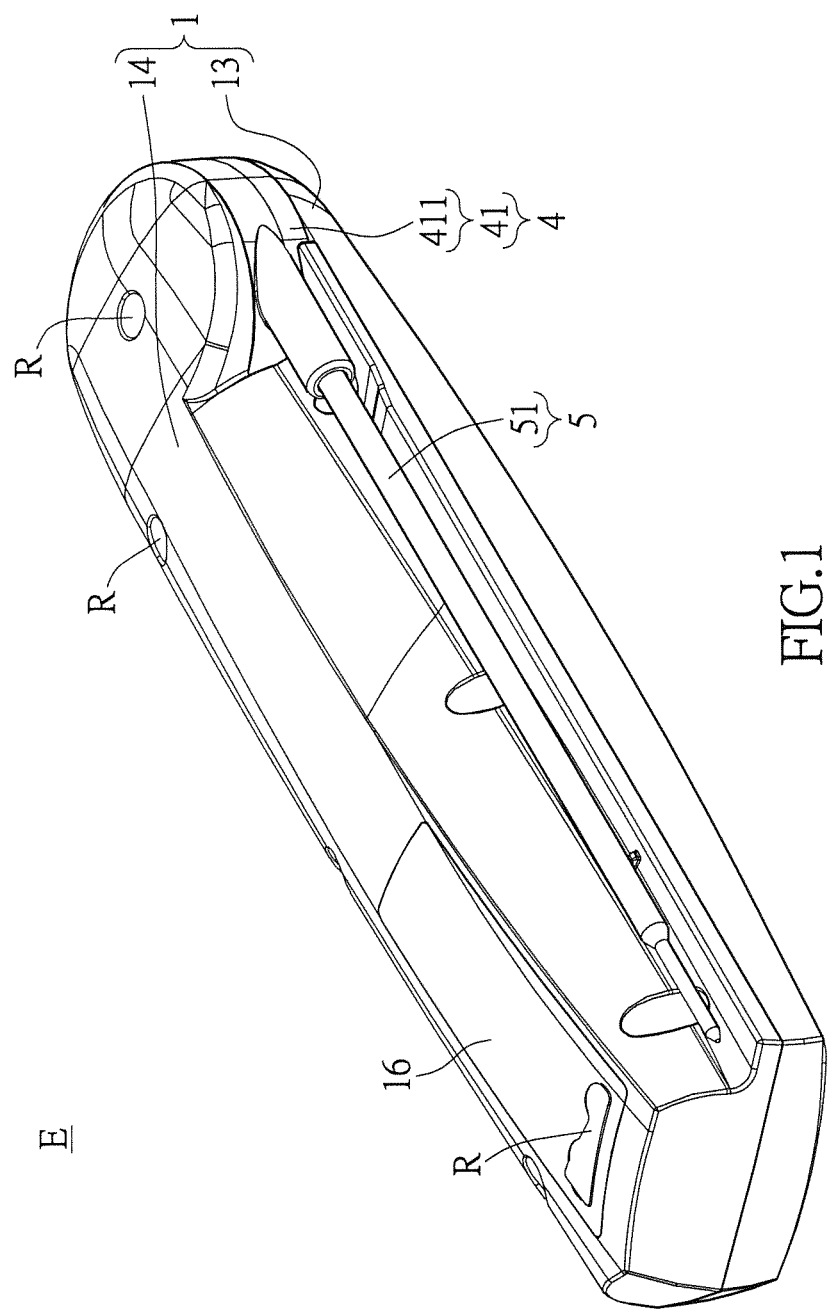
FIG. 1 shows a perspective, assembled, schematic view of the electronic thermometer in non use state according to the first and the second embodiments of the instant disclosure.
Figure 2:
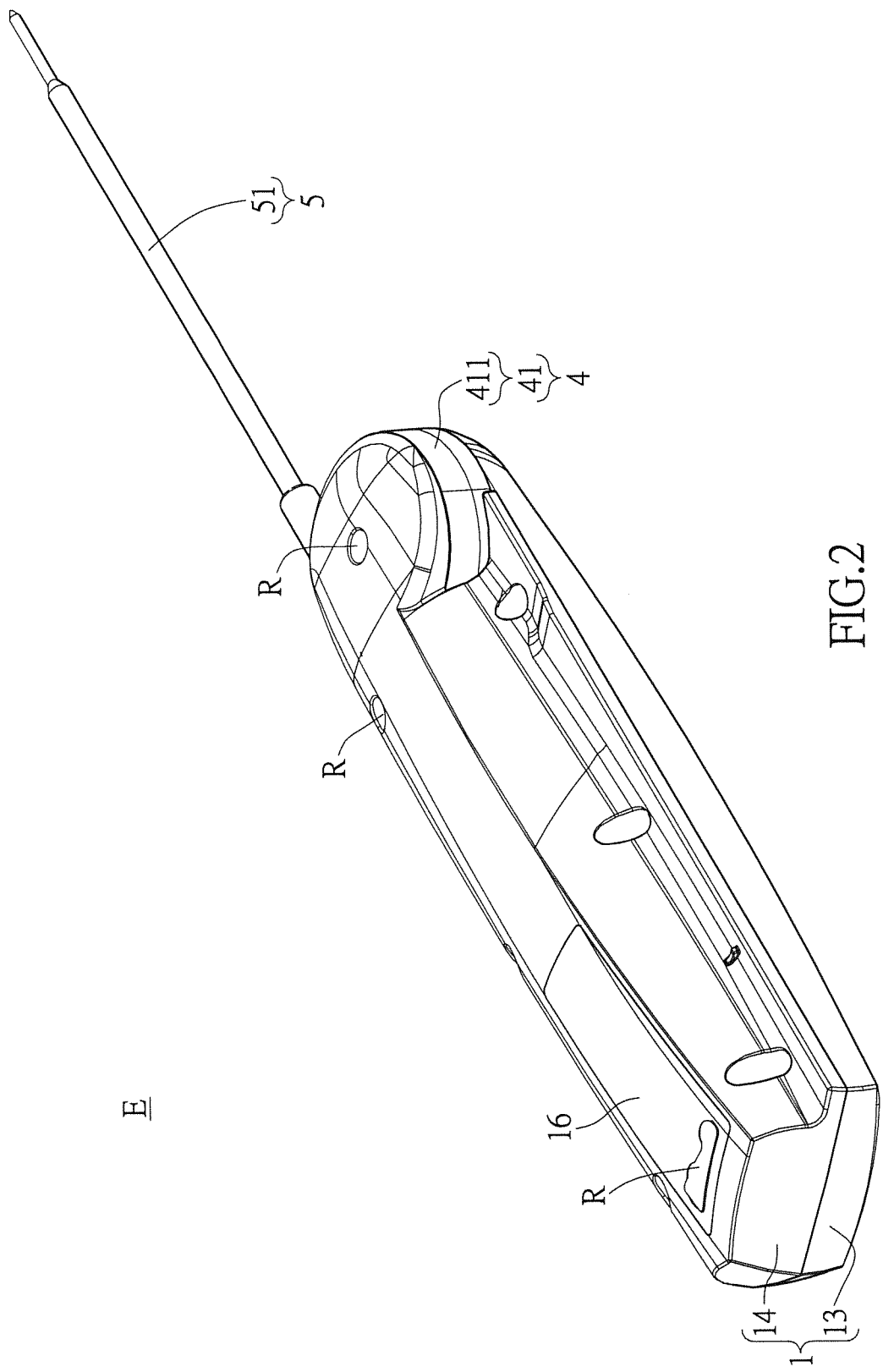
FIG. 2 shows a perspective, assembled, schematic view of the electronic thermometer in use state according to the first and the second embodiments of the instant disclosure.
Figure 3:
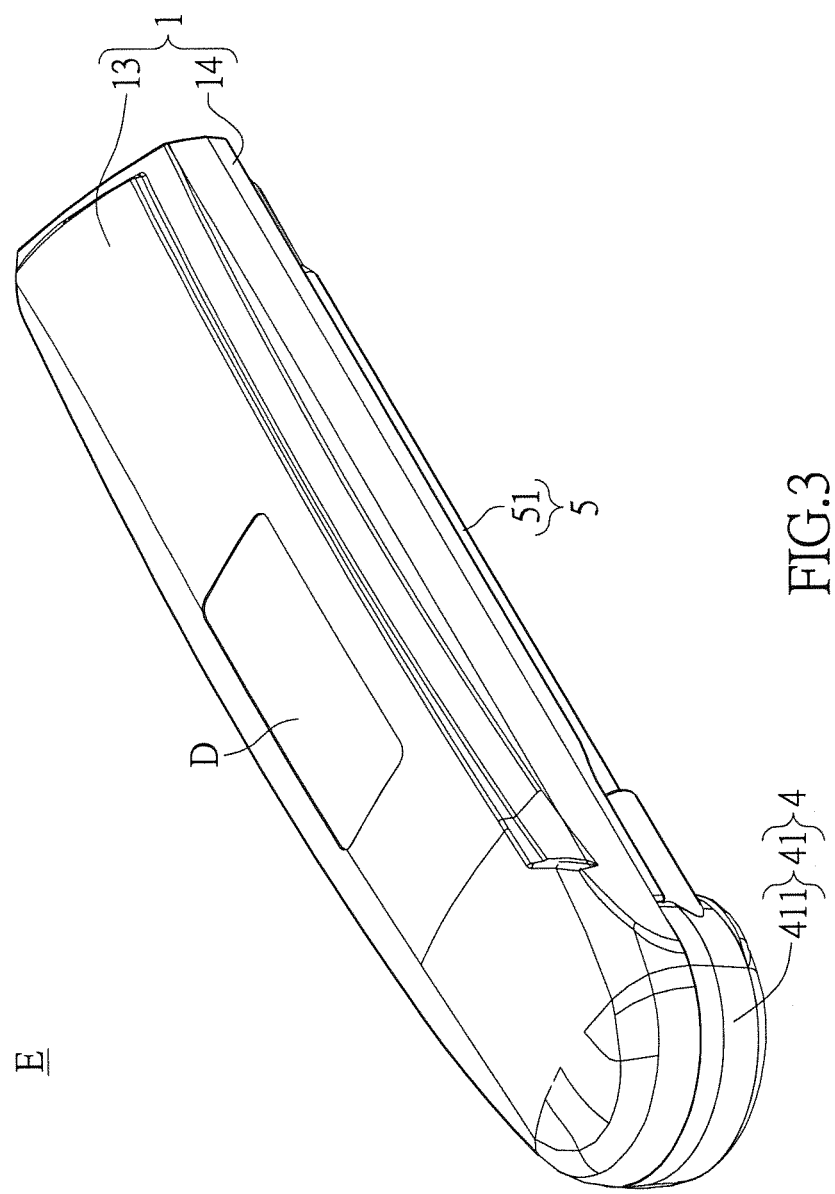
FIG. 3 shows another perspective, assembled, schematic view of the electronic thermometer in non use state according to the first and the second embodiments of the instant disclosure.
Figure 4:
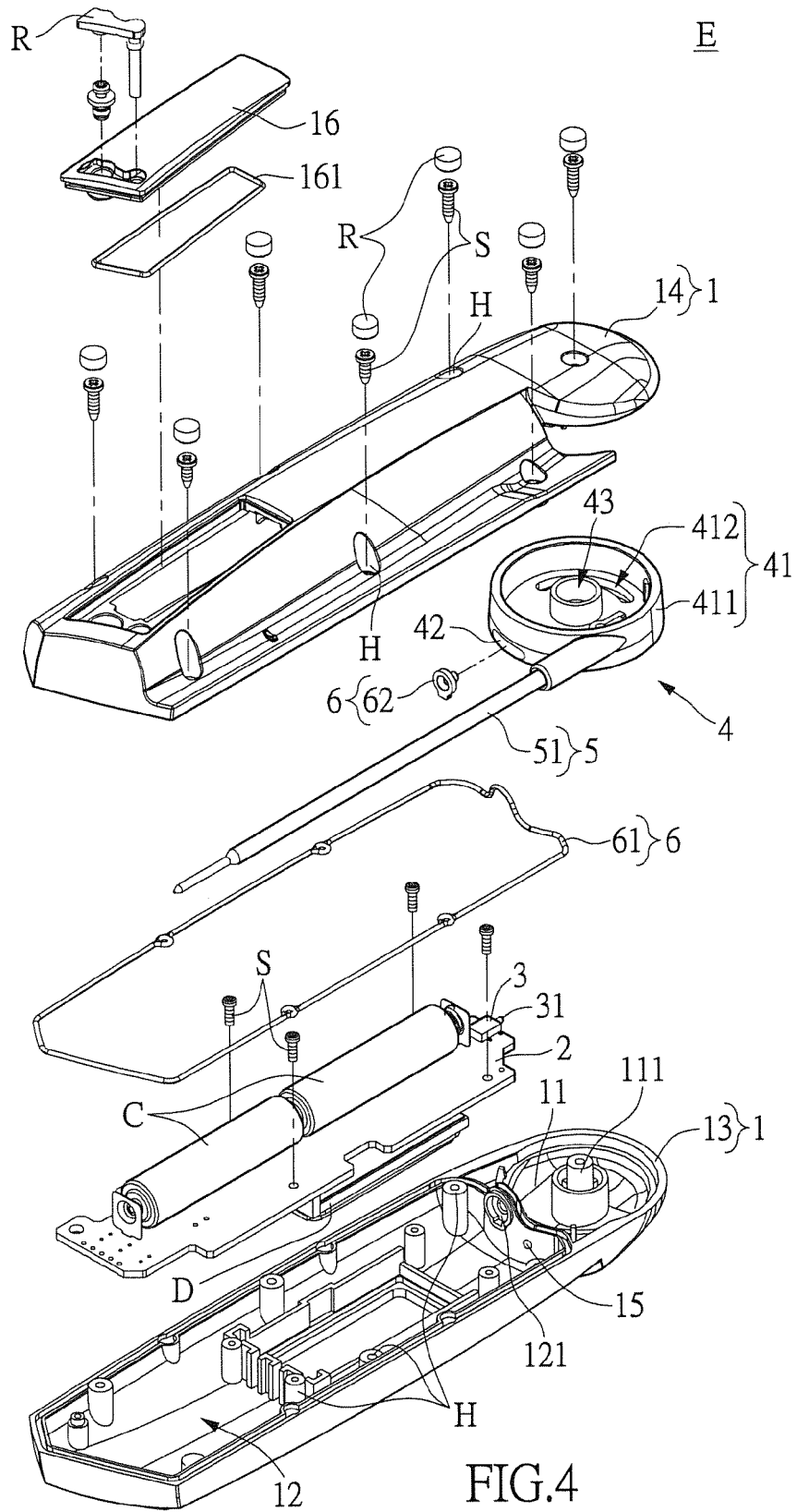
FIG. 4 shows a perspective, exploded, schematic view of the electronic thermometer according to the first embodiment of the instant disclosure.

Referring to FIG. 1 to FIG. 4, where FIG. 1 shows a perspective, assembled, schematic view of the electronic thermometer in non use state according to the first embodiment of the instant disclosure, FIG. 2 shows a perspective, assembled, schematic view of the electronic thermometer in use state according to the first embodiment of the instant disclosure, FIG. 3 shows another perspective, assembled, schematic view of the electronic thermometer in non use state according to the first embodiment of the instant disclosure, and FIG. 4 shows a perspective, exploded, schematic view of the electronic thermometer according to the first embodiment of the instant disclosure. The instant disclosure of the first embodiment provides an electronic thermometer E, comprising: an external casing unit 1, a circuit substrate 2, an electronic switch 3, a rotating arm unit 4, a probe unit 5, a waterproof unit 6 and a display module D. In the first embodiment, the electronic switch 3 of the electronic thermometer E can be turned on by matching the rotating arm unit 4 and the probe unit 5, and the electronic thermometer E can use the probe unit 5 to measure an object for obtaining a temperature signal. The temperature signal can be transmitted to the display module D through a control circuit (not shown) for displaying the temperature information of the object on the display module D.

Figure 5:
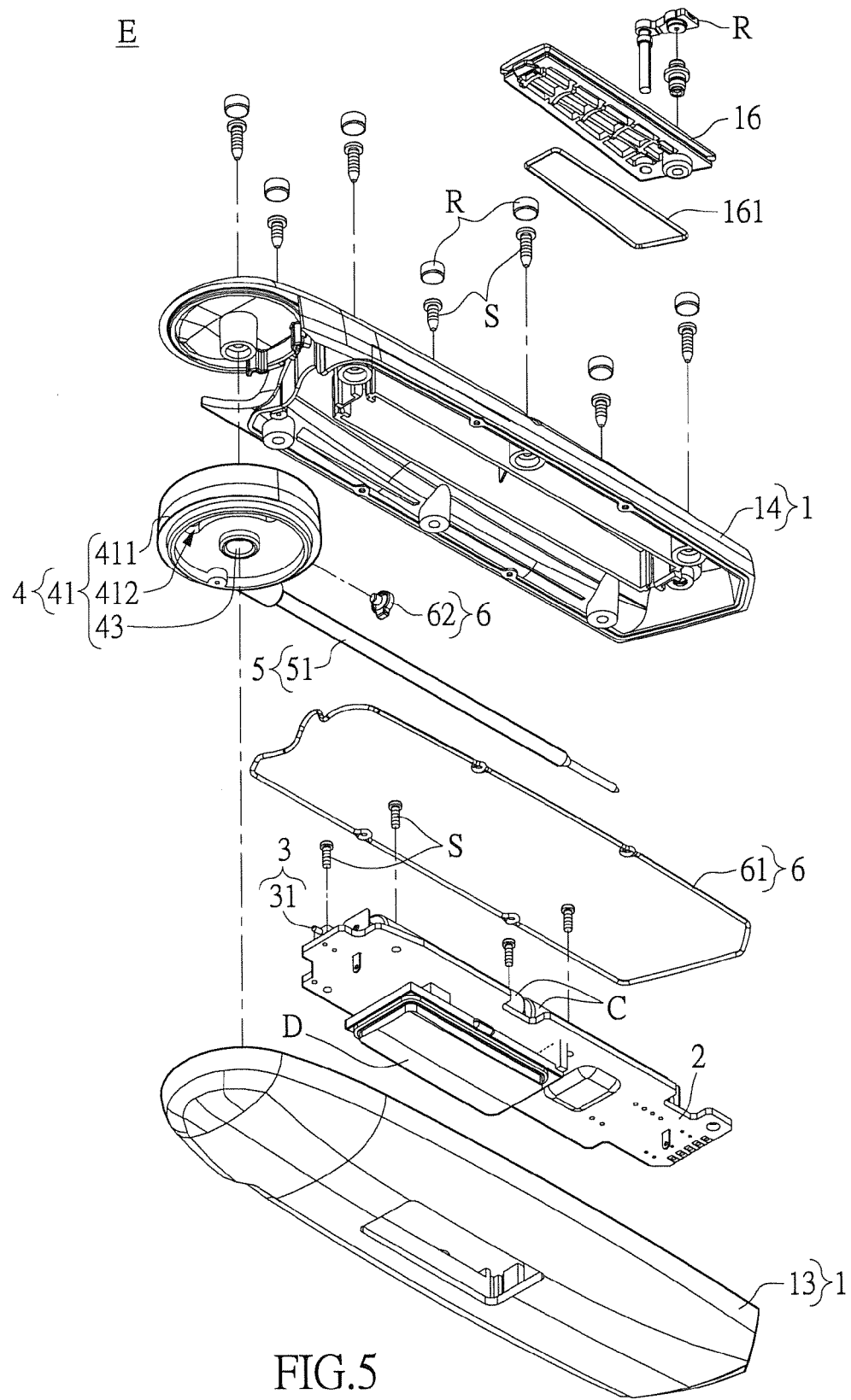
FIG. 5 shows another perspective, exploded, schematic view of the electronic thermometer according to the first embodiment of the instant disclosure.
Figure 6:
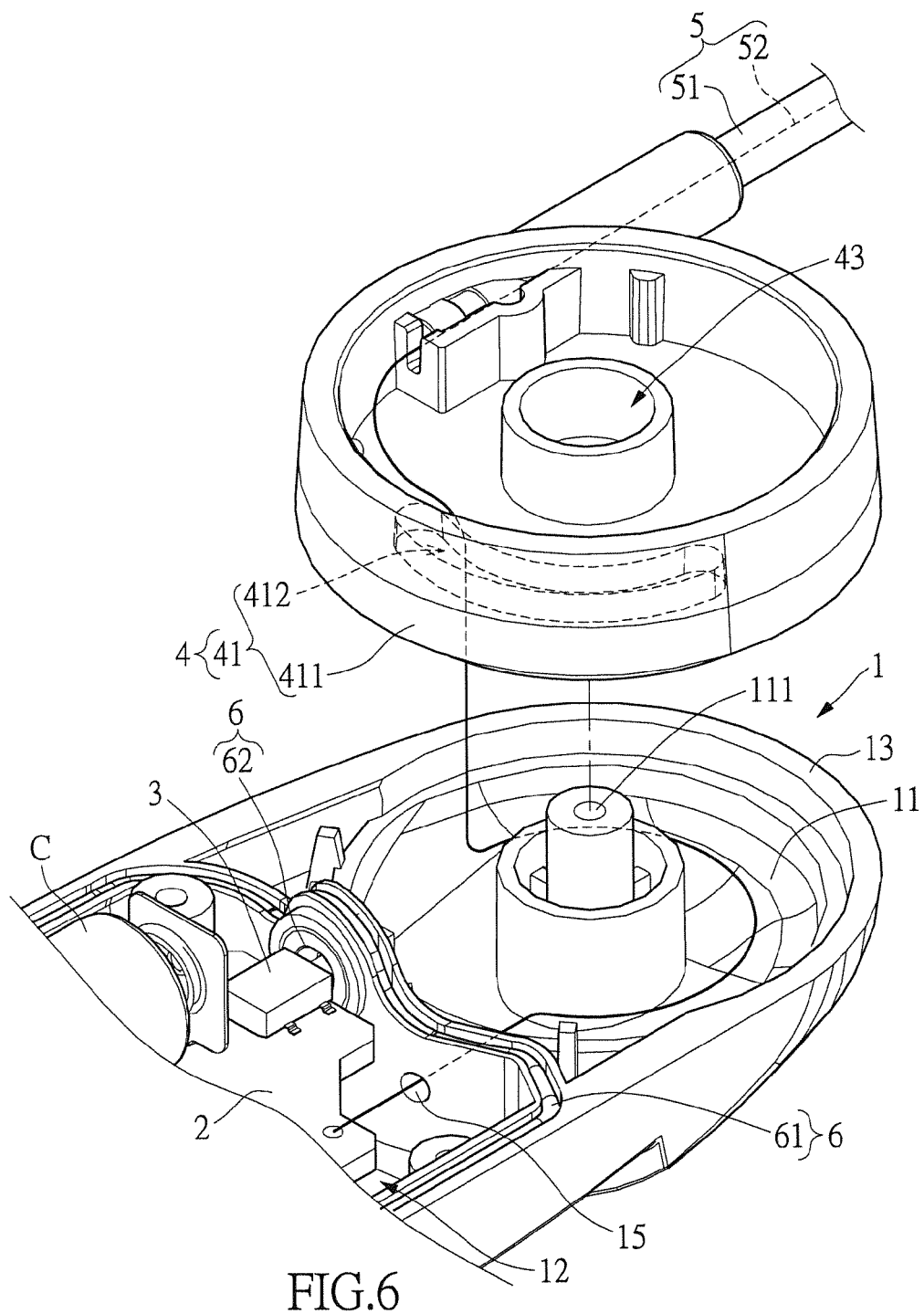
FIG. 6 shows an enlarged view of the electronic thermometer according to the first embodiment of the instant disclosure.

Referring to FIG. 4 to FIG. 6, where FIG. 5 shows another perspective, exploded, schematic view of the electronic thermometer according to the first embodiment of the instant disclosure, and FIG. 6 shows an enlarged view of the electronic thermometer according to the first embodiment of the instant disclosure. In the first embodiment, the external casing unit 1 includes a pivot shaft 111, a receiving space 12 and an extending portion 11, and the pivot shaft 111 is disposed on the extending portion 11 and outside the receiving space 12. More precisely, the external casing unit 1 includes a top cover casing 13 and a bottom cover casing 14, and the receiving space 12 is formed between the top cover casing 13 and the bottom cover casing 14. The top cover casing 13 can be positioned on the bottom cover casing 14 by matching the corresponding securing element S and the corresponding securing hole H, and each rubber plug R can be disposed on the corresponding securing element S to enclose the corresponding securing hole H for preventing water vapor from entering the receiving space 12 through the securing holes H of the external casing unit 1. In addition, the waterproof unit 6 includes a first waterproof element 61, and the first waterproof element 61 can be disposed between the top cover casing 13 and the bottom cover casing 14 and around the receiving space 12 for preventing water vapor from entering the receiving space 12 through the external casing unit 1. Hence, when circuit substrate 2 is disposed inside the receiving space 12, the circuit substrate 2 can be positioned on the top cover casing 13 through the securing element S, and the first waterproof element 61 and the rubber plugs R can be used to prevent water vapor from entering the receiving space 12 through the external casing unit 1. The display module D is disposed on the external casing unit 1 and electrically connected to the circuit substrate 2, and the display module D can use a waterproof ring (not shown) to prevent water vapor from entering the receiving space 12 through the joint between the display module D and the external casing unit 1. Moreover, the electronic switch 3 of the electronic thermometer E can be electrically connected to the circuit substrate 2, and the bottom cover casing 14 of the external casing unit 1 has a through hole 121 communicated with the receiving space 12. The electronic switch 3 includes a trigger portion 31 disposed inside the through hole 121 of the bottom cover casing 14 and corresponding to the pivot shaft 111. Furthermore, the waterproof unit 6 further includes a second waterproof element 62 fixedly disposed inside the through hole 121 of the bottom cover casing 14 to cover the trigger portion 31 of the electronic switch 3, and the shape of the second waterproof element 62 and the shape of the through hole 121 are substantially the same, thus the second waterproof element 62 can be used to prevent water vapor from entering the receiving space 12 to effect the circuit substrate 2 through the through hole 121. For example, the second waterproof element 62 may be made of rubber material. Whereby, the waterproof unit 6 can be used to prevent water vapor from entering the receiving space 12 through the through hole 121 and the joint between the top cover casing 13 and the bottom cover casing 14.

The rotating arm unit 4 includes a rotation base 41, a concave groove 42 and a pivot portion 43. The rotation base 41 is pivotally disposed on the pivot shaft 111 through the pivot portion 43, thus the rotation base 41 can be reciprocatedly moved between a first position and a second position relative to the pivot shaft 111. The probe unit 5 is disposed on the rotating arm unit 4 and electrically connected to the circuit substrate 2. More precisely, the probe unit 5 includes a probe 51 and a temperature sensing element 52, and the temperature sensing element 52 is disposed inside the probe 51 and electrically connected to the circuit substrate 2.

Referring to FIG. 6, the external casing unit 1 further has a passing hole 15 communicated with the receiving space 12, and the rotation base 41 has a semilunar slot 412. The temperature sensing element 52 of the probe unit 5 is electrically connected to the circuit substrate 2 through the slot 412 and the passing hole 15 in sequence, and the passing hole 15 is filled with gel for preventing water vapor from entering the receiving space 12 through the passing hole 15. More precisely, the external casing unit 1 further includes a battery cover 16 for covering a plurality of batteries C that are disposed on the circuit substrate 2 to provide power for the electronic thermometer E. The instant disclosure further includes a waterproof ring 161 disposed between the bottom cover casing 14 and the battery cover 16 and another rubber plug R disposed on the bottom cover casing 14, and the another rubber plug R has an elongated bottom portion for increasing the retaining strength of the another rubber plug R on the bottom cover casing 14. Hence, the waterproof ring 161 can be used to prevent water vapor from entering the receiving space 12 through the joint between the bottom cover casing 14 and the battery cover 16, and the another rubber plug R can be used to prevent water vapor from entering the receiving space 12 through the securing hole of the battery cover 16.

Figure 7A:
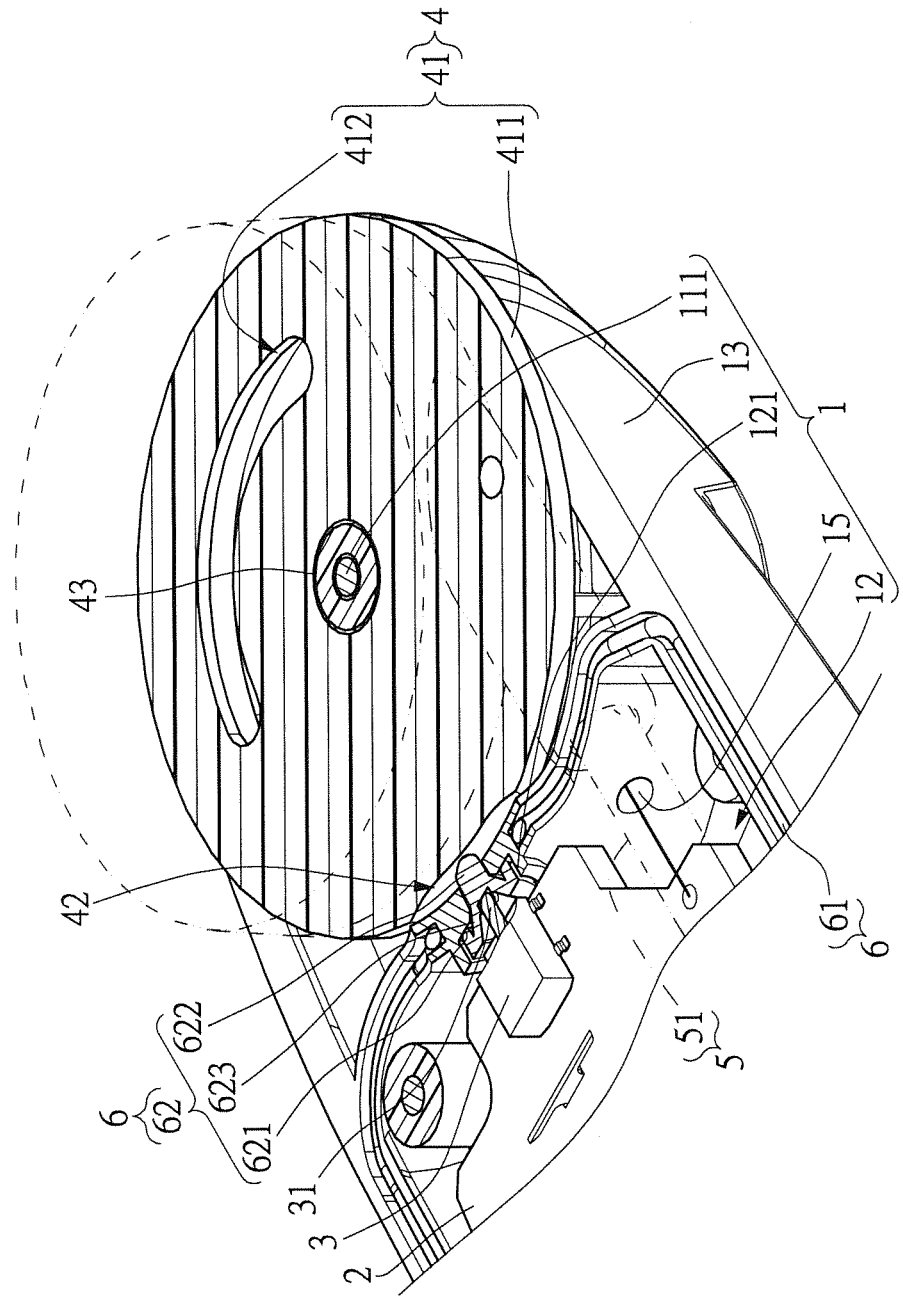
FIG. 7A shows a cross-sectional view of the electronic thermometer in non use state according to the first embodiment of the instant disclosure.

Referring to FIG. 1 and FIG. 7A, where FIG. 7A shows a cross-sectional view of the electronic thermometer in non use state according to the first embodiment of the instant disclosure. When the rotation base 41 is moved from the second position to the first position (that is to say the electronic thermometer E is in non use state as shown in FIG. 1), the rotation base 41 is separated from the trigger portion 31 of the electronic switch 3 and the second waterproof element 62 of the waterproof unit 6. In other words, when the electronic thermometer E is in non use state, the rotation base 41 cannot pull the second waterproof element 62 of the waterproof unit 6 to touch the trigger portion 31 of the electronic switch 3, thus the electronic thermometer E is turned off. More precisely, the second waterproof element 62 has a plane portion 621, a convex portion 622 opposite to the plane portion 621, and a concave portion 623 formed on the plane portion 621.

Figure 7B:
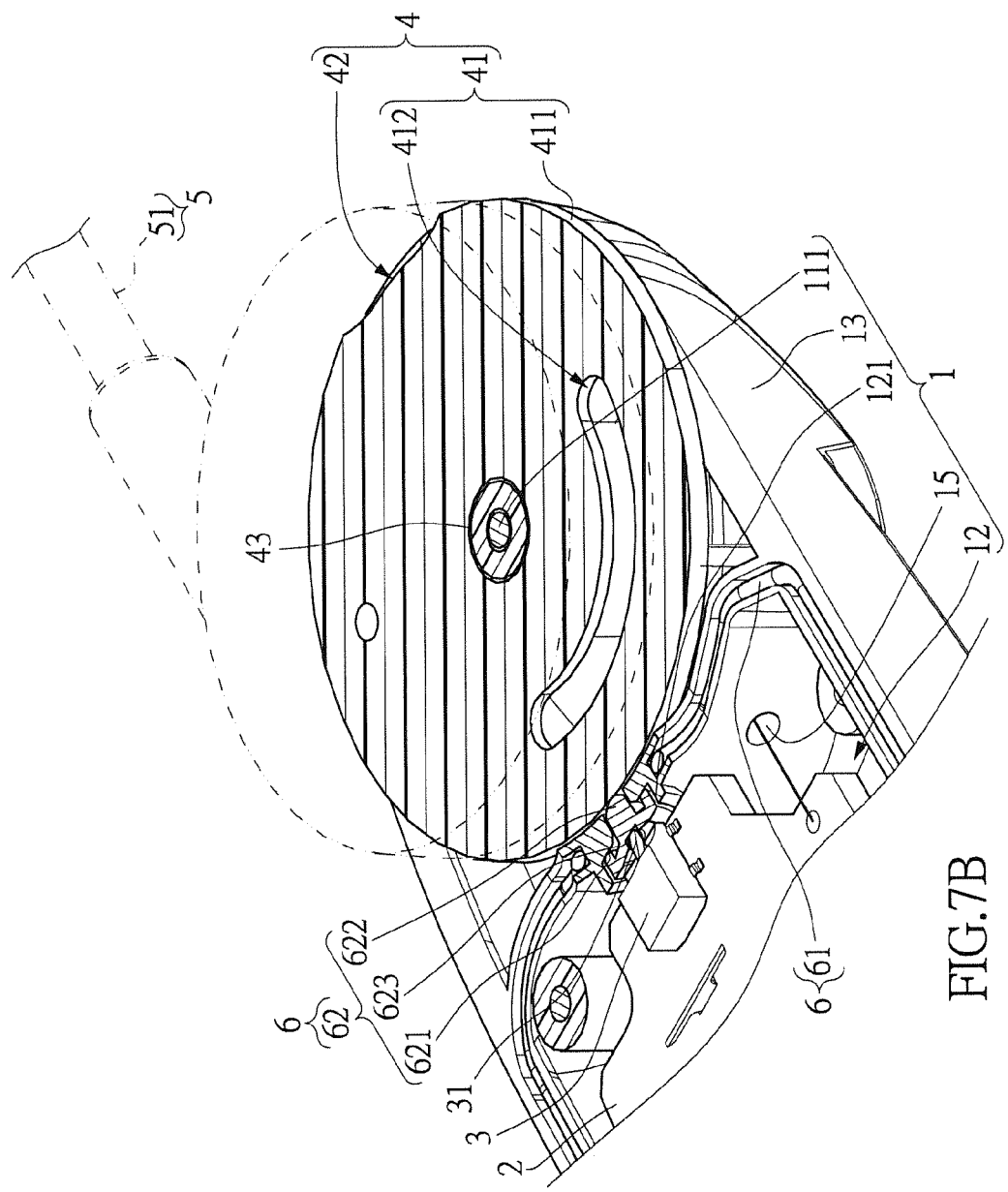
FIG. 7B shows a cross-sectional view of the electronic thermometer in use state according to the first embodiment of the instant disclosure.

Referring to FIG. 2 and FIG. 7B, where FIG. 7B shows a cross-sectional view of the electronic thermometer in use state according to the first embodiment of the instant disclosure. When the rotation base 41 is moved from the first position to the second position (that is to say the electronic thermometer E is in use state as shown in FIG. 2), the rotation base 41 has an abutting surface 411 abutted against the trigger portion 31 of the electronic switch 3 to turn on the electronic switch 3. More precisely, the plane portion 621 and the concave portion 623 of the second waterproof element 62 are made of elastic material, and the convex portion 621 can be reciprocatedly moved by matching the plane portion 621 and the concave portion 623. Hence, the abutting surface 411 of the rotation base 41 can be abutted against the trigger portion 31 of the electronic switch 3 through the convex portion 621 of the second waterproof element 62. In other words, the probe unit 5 can be rotated by a predetermined angle to move the abutting surface 411 of the rotation base 41 to abut against the elastic convex portion 621 of the second waterproof element 62, and then the plane portion 621 of the second waterproof element 62 can be pressed by the rotation base 41 for electrically contacting one metal piece to another metal piece of the trigger portion 31 of the electronic switch 3 and then turning on the electronic switch 3 of the electronic thermometer E.

Whereby, when the probe unit 5 is rotated to move the abutting surface 411 of the rotation base 41 to abut against the elastic convex portion 621 of the second waterproof element 62, the plane portion 621 of the second waterproof element 62 is pressed to abut against the trigger portion 31 of the electronic switch 3 by the rotation base 41 in order to turn on the electronic switch 3 of the electronic thermometer E. In addition, the waterproof ring 161 can be used to prevent water vapor from entering the receiving space 12 through the joint between the bottom cover casing 14 and the battery cover 16, and the another rubber plug R can be used to prevent water vapor from entering the receiving space 12 through the securing hole of the battery cover 16.

Second Embodiment

Figure 8:
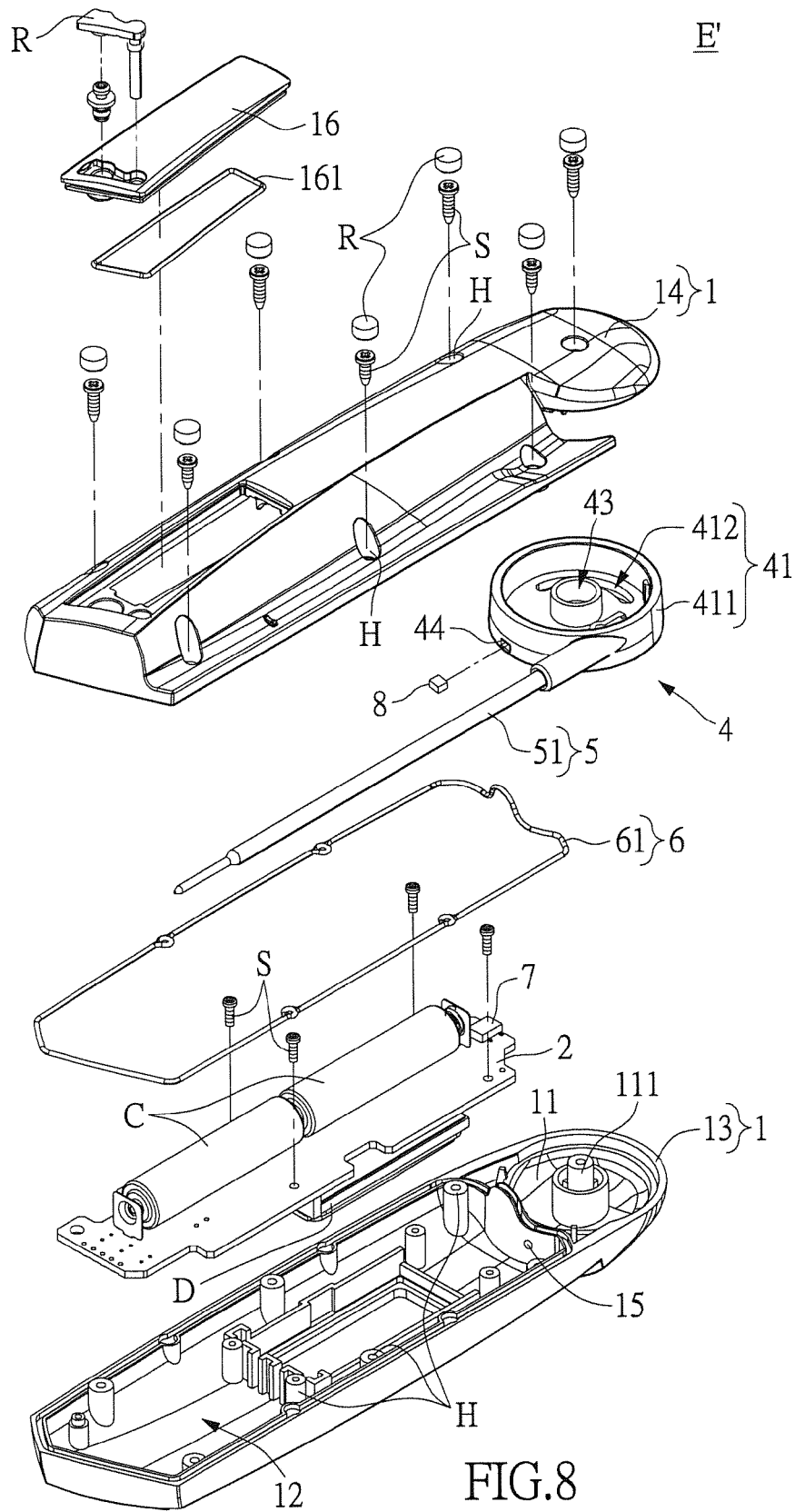
FIG. 8 shows a perspective, exploded, schematic view of the electronic thermometer according to the second embodiment of the instant disclosure.

Referring to FIG. 1 to FIG. 3 and FIG. 8, where FIG. 8 shows a perspective, exploded, schematic view of the electronic thermometer according to the second embodiment of the instant disclosure. The instant disclosure of the second embodiment provides an electronic thermometer E', comprising: an external casing unit 1, a circuit substrate 2, an induction switch 7, a rotating arm unit 4, a sensing element 8, a probe unit 5, a waterproof unit 6 and a display module D. Comparing FIG. 8 with FIG. 4, the difference between the second embodiment and the first embodiment is as follows: in the second embodiment, the sensing element 8 of the electronic thermometer E' can be turned on by matching the rotating arm unit 4 and the probe unit 5, and the electronic thermometer E' can use the probe unit 5 to measure an object for obtaining a temperature signal. The temperature signal can be transmitted to the display module D through a control circuit (not shown) for displaying the temperature information of the object on the display module D.

As shown in FIG. 8, the external casing unit 1 includes a pivot shaft 111 and a receiving space 12, and the pivot shaft 111 is disposed outside the receiving space 12. The circuit substrate 2 can be disposed inside the receiving space 12. More precisely, the external casing unit 1 includes a top cover casing 13 and a bottom cover casing 14, and the receiving space 12 is formed between the top cover casing 13 and the bottom cover casing 14. The top cover casing 13 can be positioned on the bottom cover casing 14 by matching the corresponding securing element S and the corresponding securing hole H, and each rubber plug R can be disposed on the corresponding securing element S to enclose the corresponding securing hole H for preventing water vapor from entering the receiving space 12 through the securing holes H of the external casing unit 1. In addition, the waterproof unit 6 includes a first waterproof element 61, and the first waterproof element 61 can be disposed between the top cover casing 13 and the bottom cover casing 14 and around the receiving space 12 for preventing water vapor from entering the receiving space 12 through the external casing unit 1. Hence, when circuit substrate 2 is disposed inside the receiving space 12, the circuit substrate 2 can be positioned on the top cover casing 13 through the securing element S, and the first waterproof element 61 and the rubber plugs R can be used to prevent water vapor from entering the receiving space 12 through the external casing unit 1. Whereby, the waterproof unit 6 can be used to prevent water vapor from entering the receiving space 12 through the through hole 121 and the joint between the top cover casing 13 and the bottom cover casing 14.

The rotating arm unit 4 includes a rotation base 41, a receiving groove 44 and a pivot portion 43. The rotation base 41 is pivotally disposed on the pivot shaft 111 through the pivot portion 43, thus the rotation base 41 can be reciprocatedly moved between a first position and a second position relative to the pivot shaft 111. The probe unit 5 is disposed on the rotating arm unit 4 and electrically connected to the circuit substrate 2. In addition, the induction switch 8 is electrically connected to the circuit substrate 2 and disposed in the receiving groove 44 of the rotation base 41, and the sensing element 8 is disposed on the circuit substrate 2 and received inside the receiving groove 44. More precisely, the sensing element 8 is embedded in the rotation base 41 and enclosed by the rotation base 41. For example, the induction switch 7 may be one of a Hall effect sensor switch and a magnetic reed switch, and the sensing element 8 may be a magnetic component. Moreover, the probe unit 5 includes a probe 51 and a temperature sensing element 52, and the temperature sensing element 52 is disposed inside the probe 51 and electrically connected to the circuit substrate 2. Furthermore, the external casing unit 1 further has a passing hole 15 communicated with the receiving space 12, and the rotation base 41 has a semilunar slot 412. The temperature sensing element 52 of the probe unit 5 is electrically connected to the circuit substrate 2 through the slot 412 and the passing hole 15 in sequence, and the passing hole 15 is filled with gel for preventing water vapor from entering the receiving space 12 through the passing hole 15.

Figure 9A:
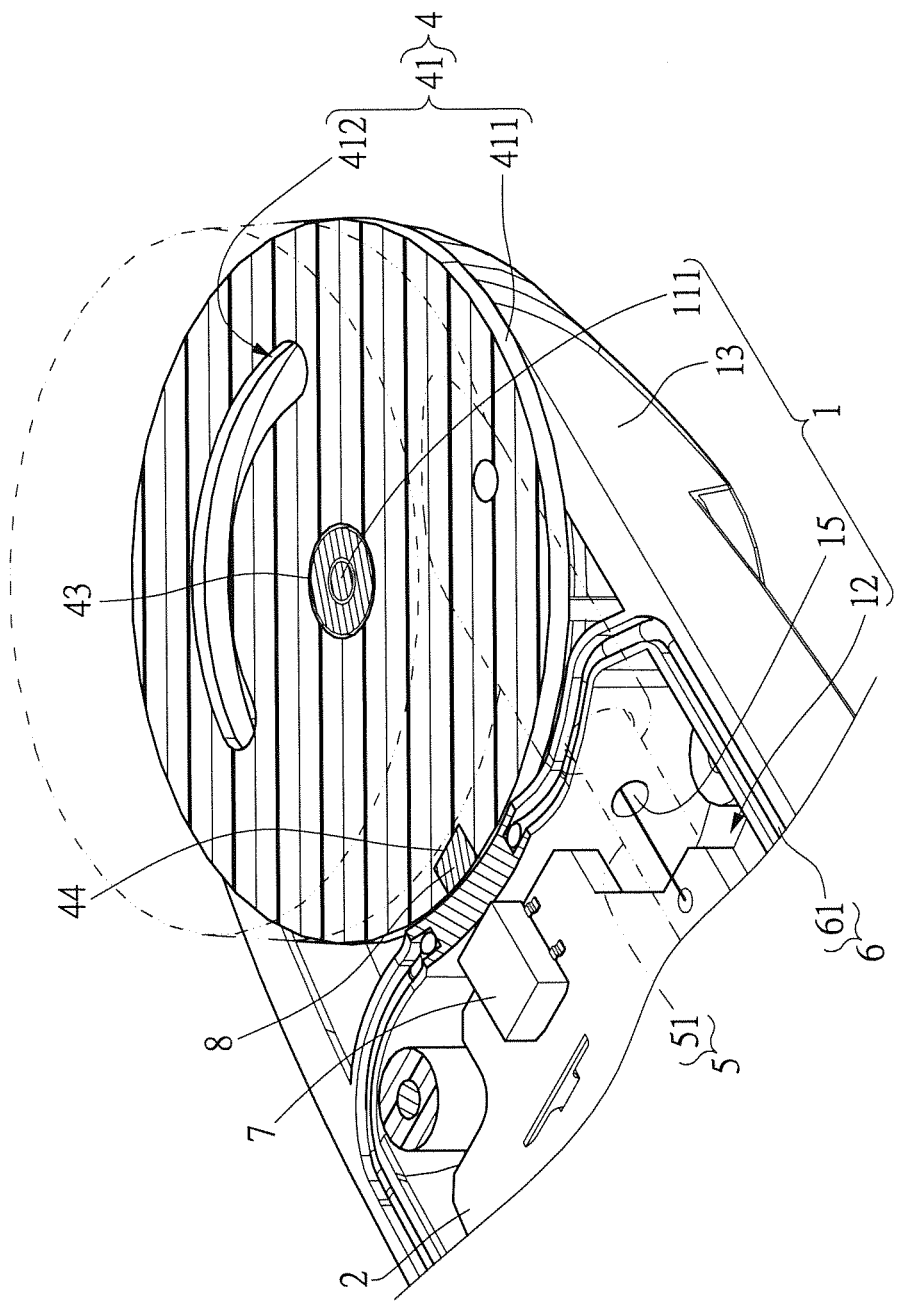
FIG. 9A shows a cross-sectional view of the electronic thermometer in non use state according to the second embodiment of the instant disclosure.
Figure 9B:
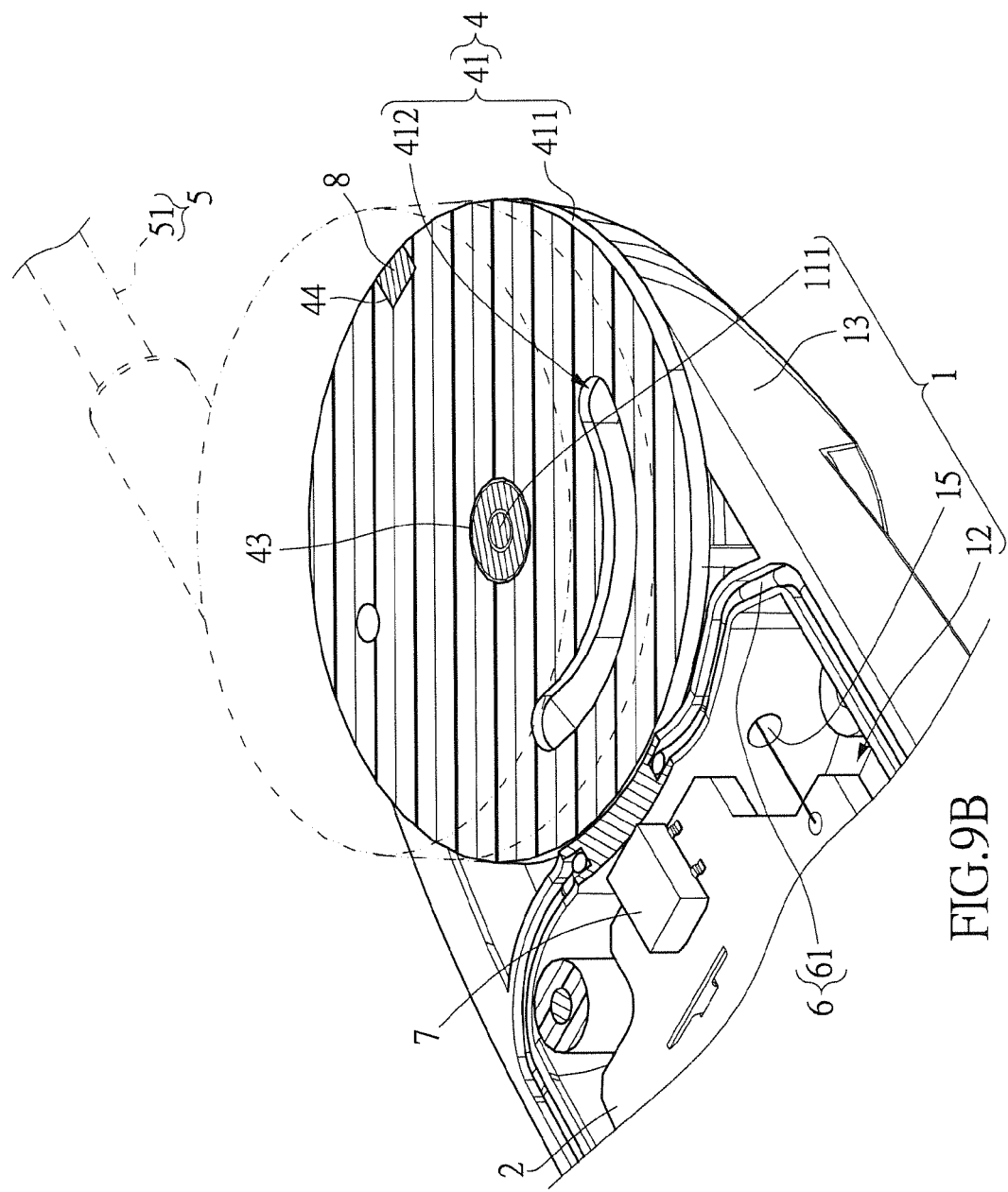
FIG. 9B shows a cross-sectional view of the electronic thermometer in use state according to the second embodiment of the instant disclosure.

Referring to FIG. 1, FIG. 2, FIG. 9A and FIG. 9B, where FIG. 9A shows a cross-sectional view of the electronic thermometer in non use state according to the second embodiment of the instant disclosure, and FIG. 9B shows a cross-sectional view of the electronic thermometer in use state according to the second embodiment of the instant disclosure. When the rotation base 41 is moved from the second position to the first position (that is to say the electronic thermometer E' is in non use state as shown in FIG. 1), the sensing element 8 is adjacent to the induction switch 7 and corresponds to the induction switch 7, thus the electronic thermometer E' is turned off while the rotation base 41 is in the first position. In addition, when the rotation base 41 is moved from the first position to the second position (that is to say the electronic thermometer E' is in use state as shown in FIG. 2), the sensing element 8 is separated from the induction switch 7 to turn on the induction switch 7.

Whereby, when the probe unit 5 is rotated to move the sensing element 8 disposed on the rotation base 41 to separate from the induction switch 7, the magnetic induction generated by the sensing element 8 cannot affect the induction switch 7, thus the induction switch 7 can be turned on by separating the sensing element 8 from the induction switch 7. In addition, the waterproof ring 161 can be used to prevent water vapor from entering the receiving space 12 through the joint between the bottom cover casing 14 and the battery cover 16, and the another rubber plug R can be used to prevent water vapor from entering the receiving space 12 through the securing hole of the battery cover 16.

In conclusion, in the first embodiment, when the probe unit 5 is rotated to move the abutting surface 411 of the rotation base 41 to abut against the elastic convex portion 621 of the second waterproof element 62, the plane portion 621 of the second waterproof element 62 is pressed to abut against the trigger portion 31 of the electronic switch 3 by the rotation base 41 in order to turn on the electronic switch 3 of the electronic thermometer E. In the second embodiment, when the probe unit 5 is rotated to move the sensing element 8 disposed on the rotation base 41 to separate from the induction switch 7, the magnetic induction generated by the sensing element 8 cannot affect the induction switch 7, thus the induction switch 7 can be turned on by separating the sensing element 8 from the induction switch 7. More precisely, the waterproof ring 161 can be used to prevent water vapor from entering the receiving space 12 through the joint between the bottom cover casing 14 and the battery cover 16, and the another rubber plug R can be used to prevent water vapor from entering the receiving space 12 through the securing hole of the battery cover 16.

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. An electronic thermometer, comprising:
an external casing unit including a pivot shaft, a receiving space and an extending portion, wherein the pivot shaft is disposed on the extending portion and outside the receiving space, the external casing unit includes a top cover casing and a bottom cover casing, the receiving space is formed between the top cover casing and the bottom cover casing, and the bottom cover casing has a through hole communicated with the receiving space;

a circuit substrate disposed inside the receiving space;

an electronic switch electrically connected to the circuit substrate, wherein the electronic switch includes a trigger portion disposed inside the through hole and corresponding to the pivot shaft;

a rotating arm unit including a rotation base, a concave groove and a pivot portion, wherein the rotation base is pivotally disposed on the pivot shaft through the pivot portion, and the rotation base is reciprocatedly moved between a first position and a second position relative to the pivot shaft;

a probe unit disposed on the rotating arm unit and electrically connected to the circuit substrate; and a waterproof unit including a first waterproof element and a second waterproof element for covering the trigger portion of the electronic switch;

wherein when the rotation base is moved from the second position to the first position, the rotation base is separated from the trigger portion of the electronic switch;

wherein when the rotation base is moved from the first position to the second position, the rotation base is abutted against the trigger portion of the electronic switch to turn on the electronic switch;

wherein the first waterproof element is disposed between the top cover casing and the bottom cover casing and around the receiving space for preventing water vapor from entering the receiving space through the external casing unit;

wherein the second waterproof element is disposed inside the through hole of the bottom cover casing for preventing water vapor from entering the receiving space through the through hole.

2. The electronic thermometer of claim 1, further comprising: a display module disposed on the external casing unit and electrically connected to the circuit substrate.

3. The electronic thermometer of claim 1, wherein the probe unit includes a probe and a temperature sensing element, and the temperature sensing element is disposed inside the probe and electrically connected to the circuit substrate.

4. The electronic thermometer of claim 3, wherein the external casing unit has a passing hole, the rotation base has a slot, the temperature sensing element is electrically connected to the circuit substrate through the slot and the passing hole in sequence, and the passing hole is filled with gel for preventing water vapor from entering the receiving space through the passing hole.

5. The electronic thermometer of claim 1, wherein the rotation base has an abutting surface abutted against the trigger portion of the electronic switch for turning on the electronic switch.

6. The electronic thermometer of claim 5, wherein the second waterproof element has a plane portion, a convex portion opposite to the plane portion, and a concave portion formed on the plane portion.

7. The electronic thermometer of claim 6, wherein the plane portion and the concave portion of the second waterproof element are made of elastic material, and the convex portion is reciprocatedly moved by matching the plane portion and the concave portion.

8. The electronic thermometer of claim 6, wherein the abutting surface of the rotation base is abutted against the trigger portion of the electronic switch through the convex portion of the second waterproof element.

9. An electronic thermometer, comprising:

an external casing unit including a pivot shaft, a receiving space and an extending portion, wherein the pivot shaft is disposed on the extending portion and outside the receiving space, the external casing unit includes a top cover casing and a bottom cover casing, and the receiving space is formed between the top cover casing and the bottom cover casing;

a circuit substrate disposed inside the receiving space;

an induction switch electrically connected to the circuit substrate;

a rotating arm unit including a rotation base, a receiving groove and a pivot portion, wherein the rotation base is pivotally disposed on the pivot shaft through the pivot portion, and the rotation base is reciprocatedly moved between a first position and a second position relative to the pivot shaft;

a sensing element disposed inside the receiving groove;

a probe unit disposed on the rotating arm unit and electrically connected to the circuit substrate; and a waterproof unit including a first waterproof element disposed between the top cover casing and the bottom cover casing and around the receiving space for preventing water vapor from entering the receiving space through the external casing unit.

10. The electronic thermometer of claim 9, wherein the induction switch is one of a Hall effect sensor switch and a magnetic reed switch.

11. The electronic thermometer of claim 9, wherein when the rotation base is moved from the second position to the first position, the sensing element is adjacent to the induction switch and corresponds to the induction switch, wherein when the rotation base is moved from the first position to the second position, the sensing element is separated from the induction switch to turn on the induction switch.

12. The electronic thermometer of claim 9, wherein the sensing element is embedded in the rotation base and enclosed by the rotation base.

13. The electronic thermometer of claim 9, wherein the probe unit includes a probe and a temperature sensing element, and the temperature sensing element is disposed inside the probe and electrically connected to the circuit substrate.

14. The electronic thermometer of claim 13, wherein the external casing unit has a passing hole, the rotation base has a slot, the temperature sensing element is electrically connected to the circuit substrate through the slot and the passing hole in sequence, and the passing hole is filled with gel for preventing water vapor from entering the receiving space through the passing hole.

* * * * *